(12) United States Patent
Kufner et al.

(10) Patent No.: US 8,677,928 B2
(45) Date of Patent: Mar. 25, 2014

(54) NOZZLE ASSEMBLY FOR DISPENSING LIQUID MATERIAL

(75) Inventors: Hubert Kufner, Lueneburg (DE); Stefan Olbrich, Brietlingen (DE)

(73) Assignee: Nordson Corporation, Westlake, OH (US)

( * ) Notice: Subject to any disclaimer, the term of this patent is extended or adjusted under 35 U.S.C. 154(b) by 112 days.

(21) Appl. No.: 13/181,849

(22) Filed: Jul. 13, 2011

(65) Prior Publication Data

US 2012/0073497 A1 Mar. 29, 2012

(30) Foreign Application Priority Data

Jul. 28, 2010 (DE) .......................... 10 2010 038 583

(51) Int. Cl.
*B05C 5/00* (2006.01)
*B05C 3/02* (2006.01)
*B05B 7/06* (2006.01)

(52) U.S. Cl.
USPC ............................ 118/300; 118/315; 118/410

(58) Field of Classification Search
USPC ................. 118/300, 313–315, 410, 411, 412; 239/549, 597, 600; 427/286, 421
See application file for complete search history.

(56) References Cited

U.S. PATENT DOCUMENTS

| | | | |
|---|---|---|---|
| 3,275,054 A * | 9/1966 | Ohl | 411/303 |
| 4,145,173 A | 3/1979 | Pelzer et al. | |
| 4,844,004 A * | 7/1989 | Hadzimihalis et al. | 118/315 |
| 2008/0135650 A1 | 6/2008 | Starke | |
| 2008/0274222 A1 | 11/2008 | Cloeren | |

FOREIGN PATENT DOCUMENTS

| | | |
|---|---|---|
| EP | 1600218 A1 | 11/2005 |
| EP | 1902787 A2 | 3/2008 |
| JP | 2003211027 A | 7/2003 |
| JP | 2005028227 A | 2/2005 |
| JP | 2005095831 A | 4/2005 |
| WO | 2004108392 A1 | 12/2004 |

OTHER PUBLICATIONS

European Patent Office, European Search Report in EP Application No. 11175409, Dec. 28, 2011.
European Patent Office, European Examination Report in EP Application No. 11175409, Feb. 7, 2013.

* cited by examiner

*Primary Examiner* — Yewebdar Tadesse
(74) *Attorney, Agent, or Firm* — Wood, Herron & Evans, L.L.P.

(57) ABSTRACT

The invention concerns a nozzle arrangement for dispensing liquid material, in particular for applying hot melt adhesive onto a substrate, comprising a nozzle orifice for dispensing the liquid material, said orifice being associated with a first and/or a second component, and positioning elements for fixing the position of the first component with respect to the second component. The invention concerns in particular a nozzle arrangement in which the positioning elements are formed as centering screws extending into fitting bores of the second component and into corresponding recesses of the first component. The invention further concerns an applicator and a production facility for applying liquid material.

18 Claims, 6 Drawing Sheets

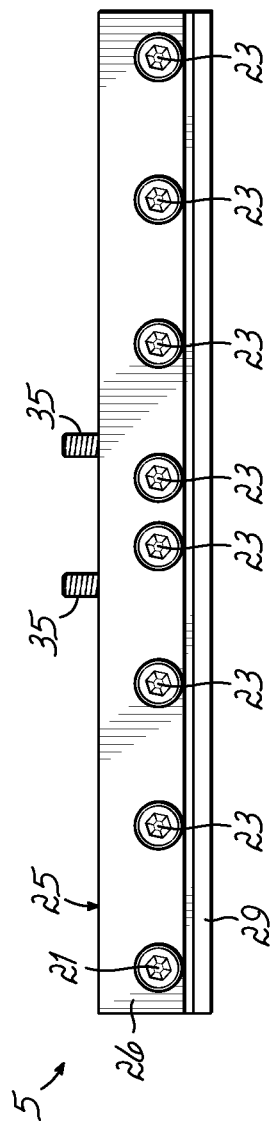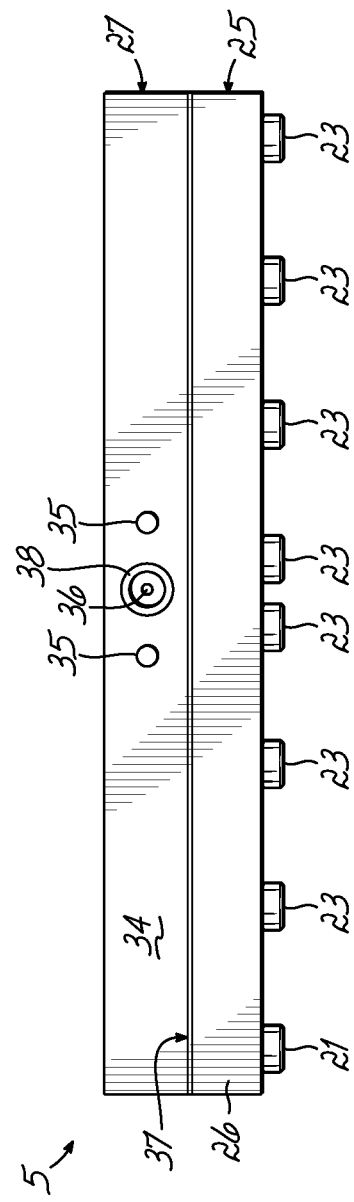

Figure 1:
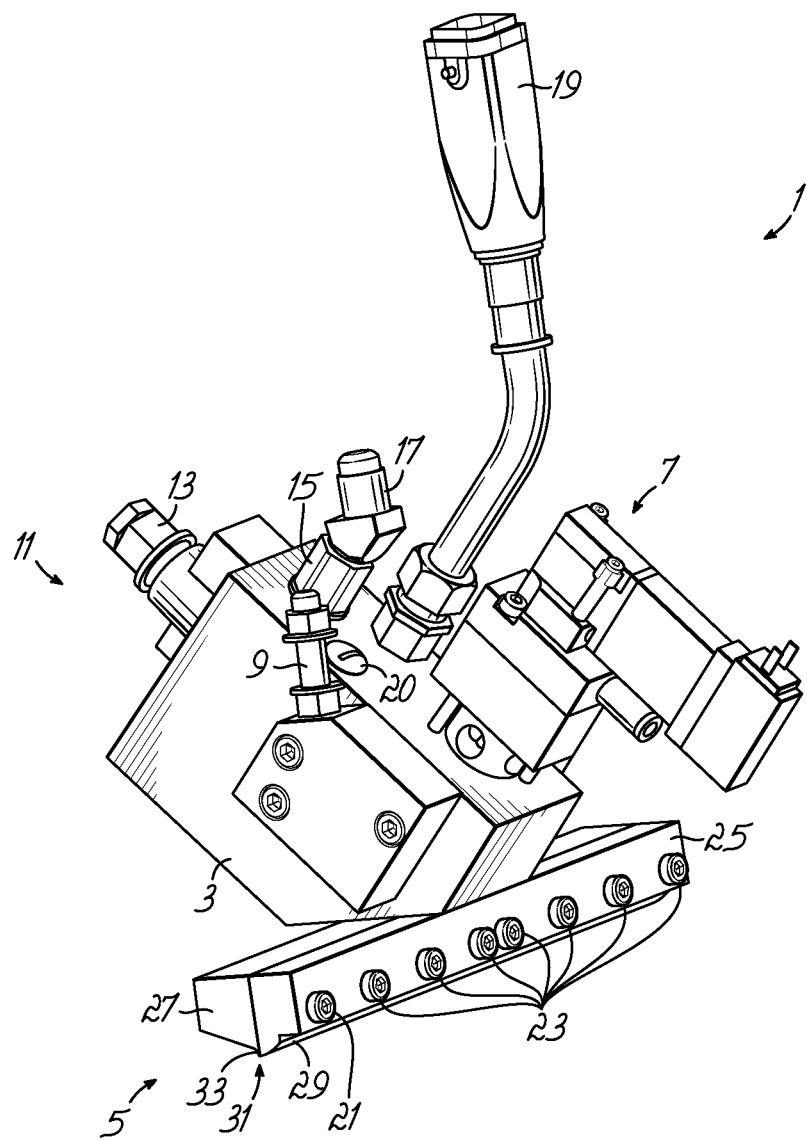

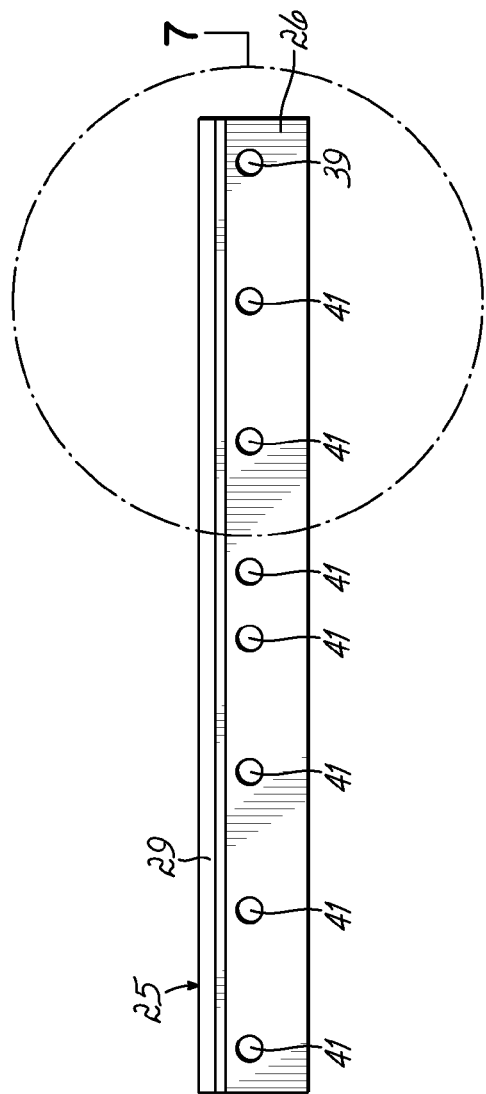
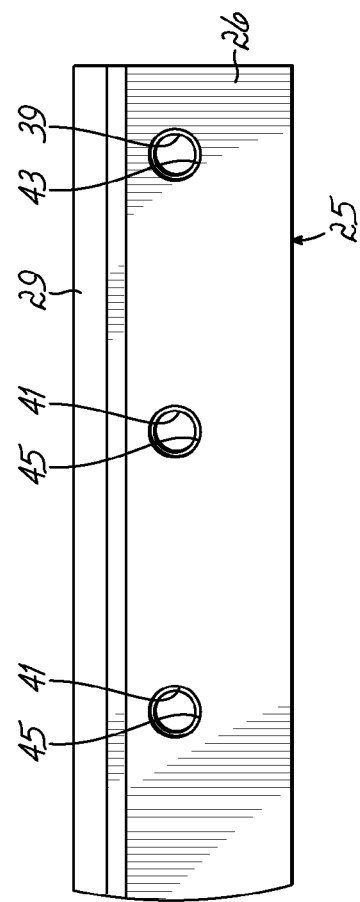
FIG. 6
FIG. 7

NOZZLE ASSEMBLY FOR DISPENSING LIQUID MATERIAL

The present invention concerns a nozzle arrangement for dispensing liquid material, in particular for applying hot melt adhesive onto a substrate, comprising a nozzle orifice for dispensing the liquid material, said orifice being associated with a first and/or a second component, and positioning elements for fixing the position of the first component with respect to the second component.

Nozzles of the above-indicated kind are used for example for the areal application of hot melt adhesive to a substrate. The nozzle arrangement has a nozzle orifice associated either with a first or a second component. The nozzle orifice can also be provided between the first and second components, whereby it is associated with both components. In certain application uses one of the components is in contact with the substrate while other application uses are performed in contact-free fashion. It will be appreciated however that in each of those use situations it is necessary for the nozzle orifice to be positioned as accurately as possible to guarantee an exact application function. That applies to the situation where the nozzle orifice is associated with a component, just as for the situation where the nozzle orifice is associated with two components.

Consequently the position of the nozzle orifice is established by means of positioning of the first and second components relative to each other. In the state of the art the first component and the second component of the nozzle arrangement are embodied by means of abutment or contact surfaces or by means of centering or locating pins which are driven into the components which are to be associated with each other, with oversize press fits.

It is considered as a disadvantage in the state of the art that positioning by means of contact surfaces requires complicated and expensive surface or edge machining and in addition that the use of locating pins makes it difficult to remove the first component from the second component (or vice-versa). It will be appreciated however that it is precisely the latter situation that is to be frequently expected for maintenance purposes or to replace worn parts.

With that background in mind the object of the present invention is to provide an applicator and a nozzle arrangement which permit reliable positioning of the first component relative to the second component and which alleviates as much as possible the disadvantages found in the state of the art.

In a nozzle arrangement of the kind set forth in the opening part of this specification, the invention attains that object in that the positioning elements are formed as centering screws extending into fitting bores of the second component and into corresponding recesses of the first component. In that respect the invention makes use of the realisation that centering or locating screws do not have to be driven into the components to be positioned, like locating pins, but can be brought into engagement by means of a screwthread by a screwing movement. The use of locating or centering screws in nozzles of the kind set forth in the opening part of this specification is hitherto unknown. A substantial advantage is to be seen in the fact that the centering or locating screws are reversibly releasable at any time, whereby the first and second components can be separated from each other. In that way maintenance operations and the replacement of worn parts for renewal or repair of the nozzle orifice can be implemented for example with a markedly reduced level of complication and expenditure. In accordance with the present invention the term centering or locating screw is used to denote for example a screw in accordance with ISO 7379.

An advantageous development of the invention provides that a first recess of the corresponding recesses in the first component is a fitting bore. The fact that a centering screw now extends both through a fitting bore in the second component and also through a fitting bore in the first component provides that the position of the first component relative to the second component is exactly established at that one point.

Preferably one or more second recesses of the corresponding recesses of the first component comprise a portion in the shape of an elongated hole. The one or more elongate holes are preferably oriented in the same direction and preferably extend in the direction of the width of the nozzle orifice. In comparison with a structure which has one or more second recesses of the corresponding recesses of the first component in the form of a fitting bore, the configuration in the form of an elongate hole reduces the static overdefinition insofar as the elongate hole extends at least in the direction of the longitudinal extent of the elongate hole. The centering screws which extend through the one or more second recesses in the first component into the fitting bores in the second component can in that way be positioned with satisfactory accuracy if the narrow side of the elongate hole substantially corresponds to the diameter of a fitting bore.

The nozzle orifice preferably has one or more orifice cross-sections, in particular one or more slots.

In an advantageous embodiment of the present invention there is provided a shim for guaranteeing a distance between the first component and the second component for forming a dispensing slot. The dispensing slot which represents the nozzle orifice can extend uninterruptedly over the entire width of the nozzle arrangement or can be subdivided into a plurality of slot portions. The width of the dispensing slot can also be directly varied by means of the dimensioning of the shim. In the present embodiment a change in the shim is particularly advantageously possible by the positioning elements provided as the centering screws being released, whereupon the shim arranged between the first and second components can be removed and changed.

The shim preferably comprises a first recess and one or more second recesses, wherein the arrangement of the first and the one or more second recesses of the shim coincides with the arrangement of the recesses of the first component. The positioning elements in the form of the centering screws in this embodiment extend through the first component, the second component and the shim.

In a further preferred embodiment of the nozzle arrangement according to the invention the first recess of the shim is a fitting bore. In that way the shim is positioned in a similar manner to the first component at that one location exactly relative to the first component and the second component. The first recess of the shim therefore forms the reference point in regard to positioning of the components, for the shim.

In a further preferred embodiment the one or more second recesses of the shim are in the form of elongate holes. Therefore the elongate holes of the shim enjoy the same advantage as the second recesses, in the form of elongate holes, of the corresponding recesses of the first component. Sufficiently precise positioning is achieved, which by virtue of the reduced static overdefinition can also be reliably reproduced when the centering screws are removed and re-fitted.

An advantageous development of the invention provides that the fitting bores of the second component and the corresponding recesses of the first component are arranged asymmetrically along the nozzle arrangement. The asymmetric arrangement provides that the first and second components and preferably also the first shim, the arrangements of which are disposed in corresponding fashion to the recesses of the first component, can be fitted only in a given orientation. It is not possible for example for the shim to be fitted in a reversed position between the first and second components because the asymmetric arrangement of the recesses is no longer congruent with the further recesses of the other components, when the orientation is reversed. That advantage also applies for nozzle arrangements with slot nozzles in which the first component is in contact with the substrate. In certain uses the shim also has a contact surface with the substrate. The contact surface is preferably produced by means of a grinding process together with a contact surface of the first component and is thus finely matched to the first component and the substrate. A reversal of the orientation of the shim would lead to accelerated wear of the shim as a consequence of contact with the substrate, and in the worst-case scenario would lead to damage to or destruction of the substrate. The configuration according to the invention of the asymmetric arrangement of the recesses however prevents that.

Preferably the first recess of the first component and the associated fitting bore of the second component are disposed in an edge portion of the nozzle arrangement. That arrangement of the recesses which form the reference point for positioning of the components relative to each other simplifies the design of an asymmetrical arrangement but also generally improves positional accuracy of the components relative to each other as in particular the angular accuracy in fitment of the first and second components to each other is increased in comparison with the arrangement of the reference recesses in a central portion of the nozzle arrangement.

In a further preferred embodiment of the nozzle arrangement according to the invention a first centering screw is associated with the first recess of the first component which is distinct from one or more second centering screws associated with the one or more second recesses of the first component. The larger the diameter of the fitting bores or the centering screw is, the correspondingly less do absolute production errors or production tolerances have an effect on the relative accuracy of positioning of the centering screw relative to the fitting bore. In that respect it is advantageous if the first recess and the first centering screw associated with the first recess are of as large dimensions as possible in order in that way to increase the exactitude of the reference point produced thereby.

Preferably the first centering screw is of a larger diameter and/or a greater length than the one or more second centering screws.

In a further preferred embodiment the recesses of the first component comprise countersinks adapted to receive heads of the centering screws. The concealed arrangement of the heads of the centering screws improves handleability of the nozzle arrangement in operation as the heads of the centering screws do not extend outside the nozzle arrangement.

Alternatively the countersink portions are provided with a diameter larger than the diameter of a fitting bore but smaller than the diameter of a bore for receiving the head of the centering screws. The heads of the centering screws are in that way admittedly exposed to more severe fouling but production of the first component which accommodates same is simplified.

In a preferred embodiment of the invention a flow channel adapted to conduct liquid to the first component for dispensing onto a substrate is formed in the second component.

In a further preferred embodiment the second component is adapted to be secured to an applicator. Alternatively the second component is in the form of part of the applicator. A nozzle arrangement of such a configuration is thus partially integrated into an applicator and is partially in the form of a separate component. Designing the nozzle arrangement by means of two separate components which are arranged externally in relation to an applicator and can be only functionally associated with the applicator requires the acceptance of an increased degree of complexity in terms of parts involved, but affords the advantage that the two parts can be replaced separately and more easily.

Preferably the first component of the nozzle arrangement is a mouthpiece and the second component of the nozzle arrangement is a mouthpiece adapter. In that embodiment the nozzle arrangement is adapted in particular for the areal application of hot melt adhesive to a substrate. The advantages of the present invention are particularly enjoyed in the case of nozzle arrangements for areal application to a substrate for the reason that the generally wide slot nozzles have an equally wide mouthpiece and a wide mouthpiece adapter which must be particularly exactly positioned on each other to ensure uniform application of fluid and to keep down the risk of damaging the substrate.

Preferably the first component and/or the second component consists of a layer-hardened or a completely hardened material. In particular completely hardened components clearly demonstrate the advantage of the present invention over the state of the art. Positioning of the first and second components relative to each other requires manufacture with very close tolerances as even very slight differences in positioning cause uneven discharge of liquid from the nozzle arrangement, in particular a slot nozzle. Layer-hardened or completely hardened components can only still be machined with difficulty, for which reason material shaping or cutting machining is carried out as far as possible prior to the hardening procedure. It will be noted however that the accuracy to size of the components suffers as a consequence of the hardening procedure. Distortion occurs. Positioning by means of contact surfaces or locating pins can generally not be implemented in the case of completely hardened components. Recesses for centering the components relative to each other must be introduced into the components, by virtue of dimensional distortion, after the hardening procedure, involving very complicated and expensive procedures, for example EDM (electrical discharge machining).

For that reason, in the case of layer-hardened or completely hardened components, the solution proposed according to the invention is particularly preferred. It has admittedly already been established that distortion of the components occurs because of the hardening procedure. In particular nozzle arrangements with slot nozzles however are substantially wider in the direction of the slot than perpendicularly thereto so that a greater dimensional distortion is to be expected in the slot direction than perpendicularly thereto. Therefore designing the one or more second recesses of the first component and possibly the shim in the form of elongate holes is particularly preferred. The elongate holes absorb the greater dimensional distortion which is to be expected in the direction of their extent. The dimensional distortion perpendicularly thereto is to be disregarded. Consequently it is possible to achieve highly exact positioning even of completely hardened components, wherein completely hardened components but also layer-hardened components, in comparison with conventional production processes, are markedly less expensive to produce and can be positioned relative to each other. A substantial advantage of the present invention is also to be seen therein.

Alternatively the first component and the second component are made from ceramic or further composite materials. The advantages which are essential to the invention are also enjoyed with those materials.

In a preferred embodiment the first centering screw and/or the one or more centering screws are in the form of a special screw. Preferably the centering screw has a threaded portion, a head and a centering portion arranged therebetween. Unlike a standard screw of the above-specified type the preferred centering screw in this embodiment has a chamfer between the threaded portion and the centering portion. The chamfer makes it easier to insert the centering screw into and pass it through the respectively associated bore in the first component, the second component and the shim.

Further preferably the centering screw in the form of a special screw has an increased width across the flats, in particular an increased hexagonal recess cross-section, relative to the above-specified standard. That reduces the susceptibility of the screw to being contaminated by means of adhesive. The screw still remains actuable even upon an increased introduction of adhesive into the recess for the wrench.

According to the invention it is further proposed that an applicator for applying liquid material, in particular hot melt adhesive, to a substrate, comprising a base body and a nozzle arrangement comprising a nozzle orifice, is to be developed such that the nozzle arrangement in the applicator is formed according to a preferred embodiment of the invention.

It is further proposed that a production facility for applying liquid material comprising one or more applicators for applying liquid material, a unit for providing the liquid material and conveying means for supplying the liquid material to the one or more applicators is developed in such a fashion that at least one of the one or more applicators has a nozzle arrangement according to a preferred embodiment of the present invention.

Figure 4:
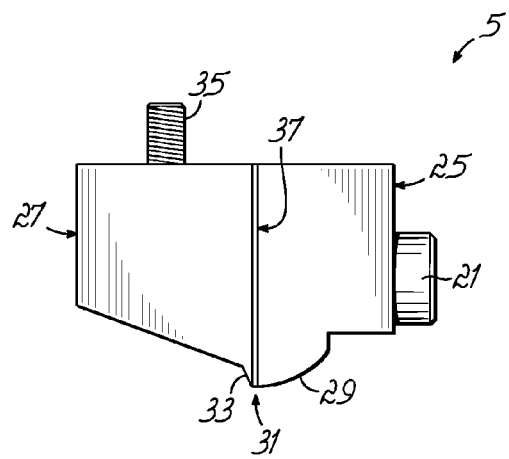
Figure 5:
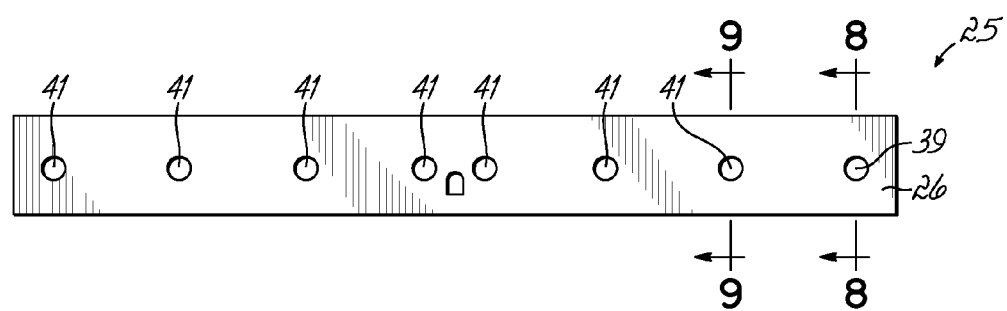
Figure 8:
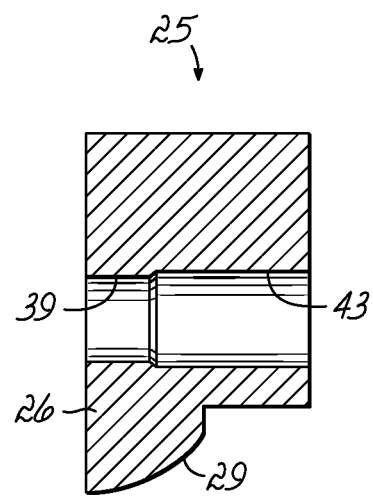
Figure 9:
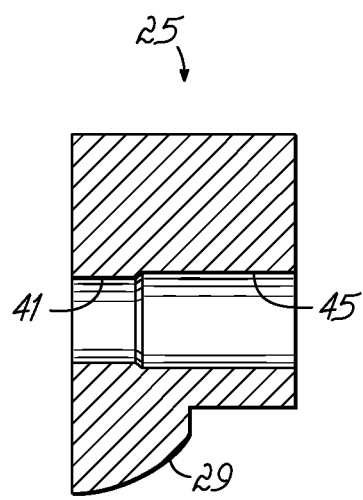
Figure 10:
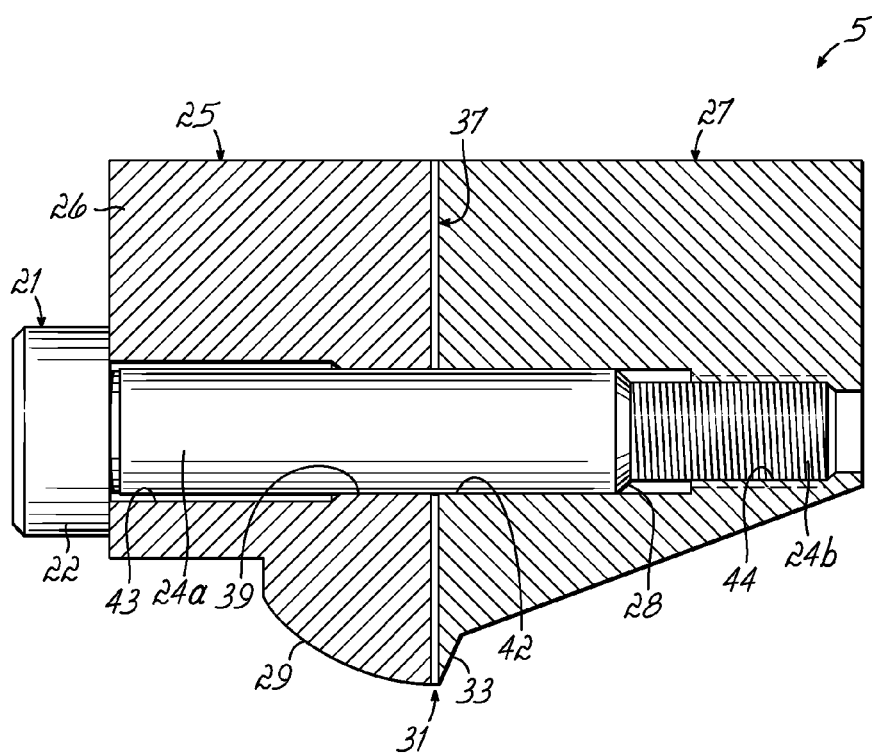

The present invention is described in greater detail hereinafter by means of preferred embodiments and with reference to the accompanying drawings in which:

FIG. 1 shows a perspective view of a nozzle arrangement according to the invention on an applicator according to the invention, FIG. 2 shows a side projection of the nozzle arrangement of FIG. 1, FIG. 3 shows a further side projection of the nozzle arrangement of FIG. 2, FIG. 4 shows still a further side projection of the nozzle arrangement of FIGS. 2 and 3, FIG. 5 shows a side view of a first component of the nozzle arrangement according to the invention, FIG. 6 shows a further side view of a first component of the nozzle arrangement according to the invention, FIG. 7 shows a detail view of FIG. 6, FIG. 8 shows a cross-sectional view of FIG. 5, FIG. 9 shows a further cross-sectional view of FIG. 5, and FIG. 10 shows a cross-sectional view through the nozzle arrangement of FIG. 1.

The applicator 1 shown in perspective in FIG. 1 has a base body 3. A nozzle arrangement 5 is connected to the base body 3. The applicator 1 shown in FIG. 1 also has a control unit 7 adapted for electrical and/or pneumatic actuation of a valve arrangement (not shown). The applicator 1 can be fitted to or in a corresponding production facility by means of a fixing pin 9 which is also arranged on the base body 3. The illustrated applicator 1 has a filter 11 fitted into the base body 3 for filtering the liquid to be dispensed, for example the hot melt adhesive to be applied. Associated with the filter 11 is a filter head 13 having a hexagonal nut and extending out of the base body 3 and into same.

The applicator 1 further has a feed means 15 for supplying the applicator with liquid, for example hot melt adhesive. For that purpose, provided on the feed means 15 is a feed connection 17 to which a feed line is in turn connected for supplying the applicator with liquid. The applicator 1 is adapted to receive liquid by means of the feed connection 17 into the feed means 15 and pass it to the filter 11. The filter 11 is adapted to allow the supplied liquid to flow through a filter body. The applicator is further adapted to pass the liquid to the nozzle arrangement 5 by means of dispensing orifices.

An electrical main connection 19 is further provided on the applicator 1. The electrical main connection 19 is adapted to pass electrical signals to the applicator and also to pass them from the applicator to an evaluation unit (not shown). In that respect the term electrical signals is used to denote switching signals or also measuring signals. The electrical main connection is also adapted to transmit switching signals for controlling the control unit 7.

An electrical dummy plug 20 closes the base body 3 at a further location. The connection covered by the electrical dummy plug 20 is adapted to provide a further electrical connection.

The electrical main connection 19 is further adapted to feed electrical power for heating the applicator 1 in the base body 3.

The nozzle arrangement 5 shown in FIG. 1 is of a two-part structure and has a first component 25 in the form of a mouthpiece and a second component 27 in the form of a mouthpiece adapter. The first component 25 and the second component 27 are fixed to each other and positioned relative to each other by means of a first locating or centering screw 21 and a total of seven second centering or locating screws 23. On the first component 25 the nozzle arrangement 5 has a rounded region 29 which extends to a nozzle orifice 31. In the present case the nozzle orifice 31 is in the form of a slot. Extending on the side of the second component 27 adjoining the nozzle orifice 31 is a break-away edge 33 which is adapted to cause the flow to break away.

FIGS. 2 through 4 show various side views of the nozzle arrangement 5 according to the invention. In this case the nozzle arrangement 5 shown in FIGS. 2 through 4 corresponds to the nozzle arrangement 5 shown in FIG. 1 in conjunction with the applicator 1. FIG. 2 shows the nozzle arrangement 5 from the direction of a substrate. The view on to the first component 25 is clear. The first component 25 is delimited downwardly by the break-away edge 33 which extends to the slot 31 (see FIG. 4). A first centering or locating screw 21 and a total of seven second centering or locating screws 23 extend through the first component 25 and are screwed to the second component (not shown). In this arrangement the first centering screw 21 and the second centering screws 23 extend into fitting bores (also not shown) in the second component 27. From a top side of the second component 27 (see FIGS. 3 and 4) two threaded portions 35 are upstanding, which are adapted to screwingly connect the nozzle arrangement 5 to an applicator 1 (as shown in FIG. 1). It will be apparent from FIGS. 2 and 3 that the first centering screw 21 and the second centering screws 23 are of an asymmetrical arrangement. In the present embodiment the asymmetry is afforded by the first centering screw 21 being of larger dimensions and requiring a larger fitting bore than the second centering screws 23. Other asymmetrical configurations include for example a variation in the spacings of the centering screws and corresponding recesses relative to each other in a horizontal and/or vertical direction.

FIGS. 3 and 4 further indicate that a shim 37 is disposed between the first component 25 and the second component 27. The shim is adapted to define the width of the nozzle orifice 31, in the present case therefore the slot.

The nozzle arrangement 5 is shown viewed from above in FIG. 3. The view is clear on to a connecting surface 34 which can be associated with a corresponding surface of the applicator 1. Provided between the two threaded portions 35 is a feed orifice 36 which is adapted to receive liquid from the applicator 1 and to feed it by means of a flow passage (not shown) to the nozzle orifice 31 (see FIG. 4). A seal 38 surrounds the feed orifice 36. The seal 38 can be in the form of a square ring or O-ring.

FIGS. 5 through 9 show various side and cross-sectional views of a first component 25 of the nozzle arrangement 5 according to the invention. In this embodiment the component 25 is in the form of a mouthpiece as already discussed hereinbefore. FIG. 5 shows a side view of the first component 25 viewed from the side of the second component 27. On its side at the right in the Figure the first component 25 has an edge portion 26 in which a first recess 39 of the first component 25 is provided for the purposes of reference formation. The first recess 39 is a fitting bore corresponding to the first centering screw 21 (see FIG. 1 through 4). FIG. 8 shows a cross-sectional view in that edge portion 26. It will be seen from that FIG. 8 that the portion of the fitting bore 39 does not extend entirely through the first component 25 but a further countersink recess 43 of a larger cross-section than that of the fitting bore 39 is provided concentrically therewith. The illustrated countersink recess 43 is not sufficiently sized to receive a head of an associated fitting screw. It is noted however that the latter configuration represents a possible and advantageous alternative.

FIG. 5 again shows a total of seven second recesses 41. The arrangement of the first recesses 39 and the second recesses 41 corresponds to the arrangement of the fitting bores (not shown) in the second component 27. A cross-sectional view of one of those second recesses 41 is shown in FIG. 9. As can also be seen from FIG. 9 the recess 41 in the form of an elongate hole does not extend entirely through the first component 25 but additionally has a recess 45 of a cylindrical configuration and arranged substantially concentrically with the elongate hole 41. The first recess 39 in the form of the fitting bore and the second recesses 41 in the form of an elongate hole are not produced completely through the entire material thickness of the first component 25, for reasons of production economy, but only in a region relevant for positioning.

FIG. 6 shows a side view from the front on to the first component 25, in comparison with FIG. 2 however without the presence of first and second centering screws 21, 23. Because of the structural identity however attention is directed in this respect to FIG. 2. It will be noted that FIG. 7 shows a portion of FIG. 6 on an enlarged scale, showing the edge portion 26 with the first recess of the first component 25 and two second recesses 41.

FIG. 7 in conjunction with FIGS. 8 and 9 shows that the countersink recesses 43 and 45 are in the form of countersink bores. With suitable dimensioning of the countersink recesses 43, 45 the heads of the centering screws 21, 23 can also be respectively received in those recesses.

FIG. 10 shows a cross-sectional view of a nozzle arrangement according to the invention in the edge portion 26. The first component 25 in the form of the mouthpiece, the shim 37 and a second component 27 in the form of a mouthpiece adapter are positioned relative to each other by means of a first centering screw 21. The first component has a rounded region 29 for substrate guidance purposes. The width of the nozzle orifice 31 in the form of a slot is defined by means of the width of the shim 37. The second component 27 has a break-away edge 33.

The first centering screw 21 has a head 22 having a recess (not shown) for receiving a wrench. The first centering screw 21 further has a fitting portion 24a and a threaded portion 24b in opposite relationship to the head 22. A chamfer 28 is arranged between the fitting portion 24a and the threaded portion 24b. The chamfer 28 is adapted to simplify passing the centering portion 24a through the first recess 39 in the form of the fitting bore and the corresponding recess in the shim 37, and to simplify introducing the centering portion 24a into the first fitting bore 42 in the second component.

The threaded portion 24b is shown in engagement with a corresponding screwthread 44 in the second component.

The countersink recess 43 is in the form of a through portion for passing therethrough the centering portion 24a of the centering screw 21. The centering screw 21 differs from a standard screw of the above-indicated specification by the provision of the chamfer 28. A further difference which however is not shown concerns the increase in the width across the flats in the screw head relative to the width across the flats of an above-identified standard screw.

The invention claimed is:

1. A nozzle arrangement for applying hot melt adhesive onto a substrate, comprising:
   a first nozzle component having first and second recesses, and a second nozzle component having first and second fitting bores,
   a nozzle orifice having a width, said nozzle orifice adapted for dispensing the liquid material,
   a first centering screw extending into said first fitting bore and into said first recess, and
   a second centering screw extending into said second fitting bore and into said second recess,
   wherein said first and/or second recesses further comprise a portion in the shape of an elongated hole extending in a direction of the width of said nozzle orifice,
   wherein said first centering screw is distinct from said second centering screw, and
   wherein said nozzle orifice is associated with at least one of said first component or second components, and further including a shim adapted to provide a distance between said first component and said second component for forming a dispensing slot, wherein said shim further comprises a first shim recess and a second shim recess wherein the arrangement of said first shim recess and said second shim recess coincides with the arrangement of said first and second recesses of said first component.

2. A nozzle arrangement according to claim 1, wherein one of said first or second recesses is a fitting bore.

3. A nozzle arrangement according to claim 1, wherein said nozzle orifice further comprises at least one slot.

4. A nozzle arrangement according to claim 1, wherein said second shim recess is formed as an elongated hole.

5. A nozzle arrangement according to claim 1, wherein said first and second fitting bores and said first and second recesses of said first component are arranged asymmetrically along the nozzle arrangement.

6. A nozzle arrangement according to claim 1, wherein said second component further includes a flow channel adapted to conduct liquid to said first component for dispensing onto a substrate.

7. A nozzle arrangement for applying hot melt adhesive onto a substrate, comprising:
   a first nozzle component having first and second recesses, and a second nozzle component having first and second fitting bores,
   a nozzle orifice having a width, said nozzle orifice associated with at least one of said first or second nozzle components and adapted for dispensing the liquid material, a first centering screw extending into said first fitting bore and into said first recess, and a second centering screw extending into said second fitting bore and into said second recess, wherein said first and/or second recesses further comprise a portion in the shape of an elongated hole extending in a direction of the width of said nozzle orifice, and wherein said first centering screw comprises a larger diameter than said second centering screw.

8. A nozzle arrangement according to claim 7, wherein one of said first or second recesses is a fitting bore.

9. A nozzle arrangement according to claim 7, wherein said nozzle orifice further comprises at least one slot.

10. A nozzle arrangement according to claim 7, wherein said first and second fitting bores and said first and second recesses of said first component are arranged asymmetrically along the nozzle arrangement.

11. A nozzle arrangement according to claim 7, wherein said second component further includes a flow channel adapted to conduct liquid to said first component for dispensing onto a substrate.

12. A nozzle arrangement according to claim 7, further comprising:

a shim adapted to provide a distance between said first component and said second component for forming a dispensing slot, wherein said shim further comprises a first shim recess and a second shim recess wherein the arrangement of said first shim recess and said second shim recess coincides with the arrangement of said first and second recesses of said first component, wherein said second shim recess is formed as an elongated hole.

13. A nozzle arrangement for applying hot melt adhesive onto a substrate, comprising:

a first nozzle component having first and second recesses, and a second nozzle component having first and second fitting bores, a nozzle orifice having a width, said nozzle orifice associated with at least one of said first or second nozzle components and adapted for dispensing the liquid material, a first centering screw extending into said first fitting bore and into said first recess, and a second centering screw extending into said second fitting bore and into said second recess, wherein said first and/or second recesses further comprise a portion in the shape of an elongated hole extending in a direction of the width of said nozzle orifice, and wherein said first centering screw comprises a greater length than said second centering screw.

14. A nozzle arrangement according to claim 13, wherein one of said first or second recesses is a fitting bore.

15. A nozzle arrangement according to claim 13, wherein said nozzle orifice further comprises at least one slot.

16. A nozzle arrangement according to claim 13, wherein said first and second fitting bores and said first and second recesses of said first component are arranged asymmetrically along the nozzle arrangement.

17. A nozzle arrangement according to claim 13, wherein said second component further includes a flow channel adapted to conduct liquid to said first component for dispensing onto a substrate.

18. A nozzle arrangement according to claim 13, a shim adapted to provide a distance between said first component and said second component for forming a dispensing slot, wherein said shim further comprises a first shim recess and a second shim recess wherein the arrangement of said first shim recess and said second shim recess coincides with the arrangement of said first and second recesses of said first component, wherein said second shim recess is formed as an elongated hole.

* * * * *